(12) United States Patent
Chen et al.

(10) Patent No.: US 10,743,238 B2
(45) Date of Patent: Aug. 11, 2020

(54) SYSTEM INFORMATION UPDATES IN BAND WIDTH PART (BWP) SWITCH OPERATION

(71) Applicant: FG Innovation Company Limited, Tuen Mun (HK)

(72) Inventors: Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/191,465

(22) Filed: Nov. 15, 2018

(65) Prior Publication Data

US 2019/0150064 A1 May 16, 2019

Related U.S. Application Data

(60) Provisional application No. 62/586,598, filed on Nov. 15, 2017.

(51) Int. Cl.
*H04W 4/00* (2018.01)
*H04W 48/10* (2009.01)
*H04W 48/12* (2009.01)

(52) U.S. Cl.
CPC ............ *H04W 48/10* (2013.01); *H04W 48/12* (2013.01)

(58) Field of Classification Search
CPC .............................. H04W 48/10; H04W 48/12
USPC ......................................... 370/328, 329, 330
See application file for complete search history.

(56) References Cited

U.S. PATENT DOCUMENTS

| 2019/0053029 A1* | 2/2019 | Agiwal ................. H04W 76/27 |
| 2019/0132109 A1* | 5/2019 | Zhou .................... H04L 5/0098 |

* cited by examiner

*Primary Examiner* — Chuong T Ho
(74) *Attorney, Agent, or Firm* — ScienBiziP, P.C.

(57) ABSTRACT

A user equipment (UE) for wireless communication is configured to perform bandwidth part (BWP) switching operation in response to receiving a system information change indication. The UE receives the system information change indication via a currently active BWP in a BCCH modification period. The system information change indication notifies the UE that contents of system information have been changed. The UE switches from the currently active BWP to an initial active BWP to receive the changed contents of system information which are required for the UE. The UE receives the changed contents of system information via the initial active BWP in a next BCCH modification period that immediately follows the BCCH modification period. The UE updates the system information according to the changed contents.

20 Claims, 10 Drawing Sheets

SYSTEM INFORMATION UPDATES IN BAND WIDTH PART (BWP) SWITCH OPERATION

CROSS REFERENCE TO RELATED APPLICATIONS

This application claims the benefit of and priority to U.S. Provisional Application No. 62/586,598 filed on Nov. 15, 2017 and entitled "SYSTEM INFORMATION UPDATE IN BWP SWITCH OPERATION," (hereinafter referred to as "US72315 application"). The disclosure of the US72315 application is hereby incorporated fully by reference into the present disclosure.

TECHNICAL FIELD

The present disclosure generally relates to a method for bandwidth part switching operations performed by a user equipment and user equipment performing the same.

BACKGROUND

In a cellular network, a UE-specific serving cell may configure one or more bandwidth parts (BWPs) in downlink and uplink respectively for a UE by dedicated RRC signaling. One the other hand, a UE may be allocated to with at most one active DL BWP and one active UL BWP at a given time by the cell. A single scheduled downlink control information (DCI) may be applied to switching from one active BWP to another for an operating UE.

For a UE, an initial active DL BWP is defined as the frequency location and bandwidth dedicated for broadcasting remaining minimum SI (RMSI). When the NW sends to a Connected_UE a system information (SI) change indication that notifies of system information change, the Connected_UE may have to switch from the currently active BWP to the initial active BWP for accessing the RMSI and updating to the changed SI if there is no SI broadcasting on the currently active BWP. Furthermore, the Connected_UE may not successfully complete SI update if there is no clear UE behavior defined for BWP switching. As a result of BWP switching inability problem, the UE may not be able to update system information.

SUMMARY

The present disclosure is directed to bandwidth part (BWP) switching operations in conjunction with system information updates for a user equipment.

In one aspect of the present disclosure, a method for bandwidth part (BWP) operations performed by a user equipment (UE) of a connected state is provided. The method comprises receiving a system information (SI) change indication broadcasted by a paging via a currently active bandwidth part (BWP) during a modification period; switching from the currently active bandwidth part (BWP) for data transmission to an initial active BWP for an SI update; receiving remaining minimum SI (RMSI) via the initial active BWP during a next modification period that immediately follows the modification period, the RMSI including information associated with changed system information blocks (SIBs); determining which of the changed SIBs is required to be updated for the UE; and receiving content of the required changed SIBs based on the determination.

In one aspect of the present disclosure, a user equipment (UE) of a connected state is configured to receive a system information (SI) change indication broadcasted by a paging via a currently active bandwidth part (BWP) during a modification period; to switch from the currently active bandwidth part (BWP) for data transmission to an initial active BWP for an SI update; to receive remaining minimum SI (RMSI) via the initial active BWP during a next modification period that immediately follows the modification period, the RMSI including information associated with changed system information blocks (SIBs); to determine which of the changed SIBs is required to be updated for the UE; and to receive content of the required changed SIBs based on the determination.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
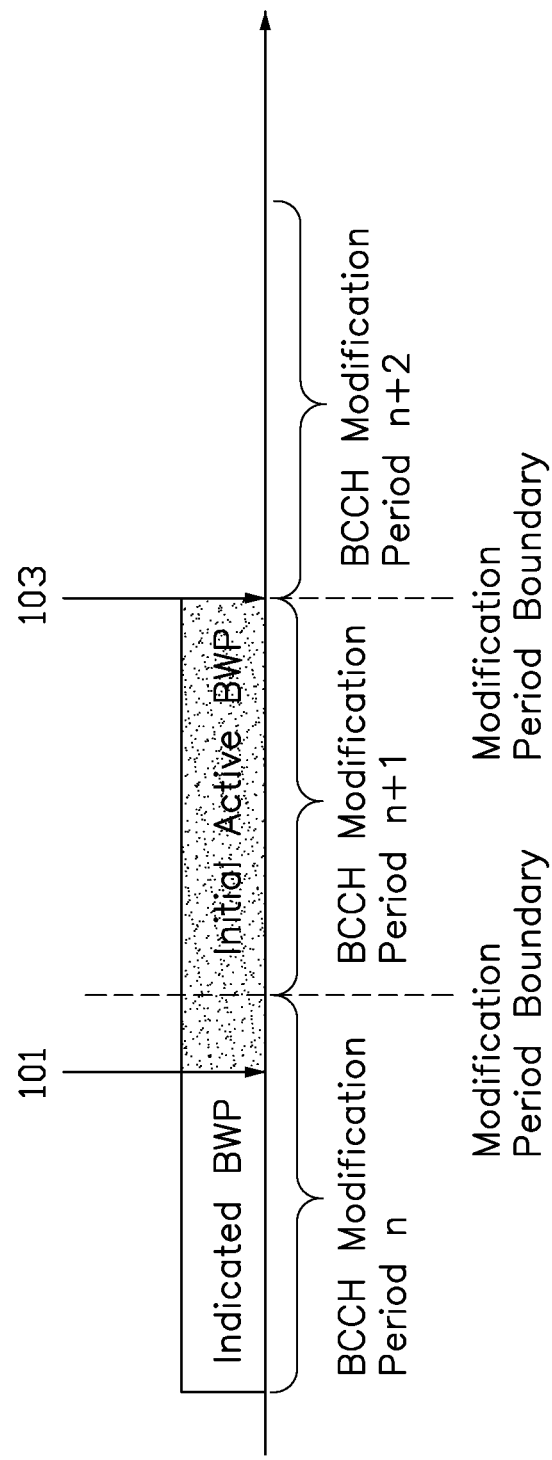
FIG. 1 is a schematic diagram illustrating a BWP switching operation for a Connected_UE due to receiving an SI change indication in accordance with one exemplary embodiment of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

It is noted that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a personal digital assistant (PDA), or a television display with wireless communication capability. The UE is configured to receive and transmit signals over an air interface to one or more cells in a radio access network.

A base station may include, but is not limited to a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G Access Network (5G-AN), and any other apparatus capable of controlling radio communication with cellular positioning technology and managing radio resources within a cell. The base station may connect to serve the one or more UEs through a radio interface to the network.

In one embodiment of the present disclosure, a Connected_UE may implicitly switch to an initial active BWP upon receiving a system information (SI) change indication broadcasted by paging from cellular network (NW). The SI change indication indicates a SI change/modification and notifies the UE to update to the changed SI if required by the UE. This results in reduction of redundant L1 signaling for switching from a currently active BWP to the initial active BWP for the UE. In FIG. 1, a BWP switching operation for a Connected_UE due to receiving an SI change indication is illustrated. In DL, the UE may operate on an indicated BWP as currently active DL BWP for DL data transmission (e.g., based on RRC configuration, DCI control or the behavior for BWP inactivity timer) or operate on an initial active DL BPW able to receive the content of changed SI required for the UE SI update. The UE may also have an uplink (UL) BWP for UL data transmission and an initial active UL BWP. Within $n^{th}$ broadcast control channel modification period (denoted as BCCH modification period n), the UE may operate on the indicated BWP as the currently active BWP for data transmission according to L1 signaling.

The SI change indication is sent to the UE by paging (e.g., a Short Message) from the NW while the UE operates on the indicated BWP. Specifically, the UE receives indications about SI modifications and/or PWS notifications using Short Message transmitted with P-RNTI over downlink control information (DCI). At 101, upon receiving the SI change indication, UE may switch immediately to the initial active BWP from the indicated BWP during BCCH modification period n. The SI change indication is used to inform the UE that there is a system information change(s) or update(s), and may be carried as part of the Short Message. Then, RRC sublayer of the NW may inform the PHY sublayer that the paging has been sent to the UE and the switching of the UE to the initial active BWP has been performed. So, the NW may stop sending to the UE any other L1 signaling (e.g., DCI) for BWP switching operations.

After switching to the initial active BWP, the UE may continue to stay on the initial active BWP until BCCH modification period n+1 ends. The BCCH modification period n+1 immediately follows the BCCH modification period n in time sequence. Although the UE has switched to the initial active BWP at certain timing (e.g., at 101) within BCCH modification period n, it is in the next BCCH modification period n+1 that the UE performs the system information acquisition to update to changed system information. In modification period n+1, the UE may receive broadcast remaining minimum system information (RMSI) carrying information associated with changed system information blocks (SIBs) via the initial active BWP and perform the SI update(s) according to the information. The RMSI is also known as SIB1 (system information block 1). The UE may receive the RMSI at certain time point in modification period n+1 (e.g., at the start time point of the modification period n+1). After receiving the RMSI, the UE may determine which of the changed SIB(s) is (or are) required for the SI update(s) according to the received information. For example, the UE may identify one or more of the changed SIB(s) that the UE requires for the SI update(s). Then the UE may receive the content(s) of the changed SIBs which are identified as being required for the SI update(s) based on the determination. For another example, the UE may identify none of the changed SIBs is required to update and may not perform any SI update(s). The UE may not update the changed SIB(s) based on the identification within BCCH modification period n+1.

After the UE completes the SI update(s), the NW may re-take control over the BWP switching of the UE on the end of BCCH modification period n+1.

In this case, since the NW may know the UE by default will complete the SI update within modification period n+1, the PHY sublayer may re-take control over the BWP switching after BCCH modification period n+1 ends. Therefore, at 103 on the ending boundary of modification period n+1 the NW re-takes the BWP switching operations by sending L1 signaling to switch the initial active BWP to a BWP for subsequent data transmission.

In one embodiment, the currently active BWP happens to be the initial active BWP. In this case, it is not necessary that a BWP switching operation is involved for updating the SI when receiving the SI change indication. For example, the Connected UE has already been on the initial active BWP as currently active BWP because of certain on-going services in modification period n and will stay on the initial active BWP to perform system information acquisition to conduct the SI update in BCCH modification period n+1. The PHY sublayer of the NW may consider the completeness of the SI update in the next BCCH modification period n+1. Then, the PHY sublayer of the NW may re-take control over the BWP switching operation on the end of BCCH modification period n+1.

In one embodiment, the UE may be only permitted to receive the Short Message of the paging on the initial active BWP. For example, based on the paging frame and paging occasion derived from an associated UE ID and per-configured parameters, the Short Message cannot be broadcasted on other BWPs but the initial active BWP. On occasions, the UE may switch to the initial active BWP automatically to detect whether there is a Short Message and receiving the Short Message. If receiving the SI change indication carried in the Short Message, the UE may stay on the initial active BWP for the subsequent SI update without the need for additional BWP switching. If receiving no Short Message or no SI change indication carried in the Short Message, the UE may switch back to the previous active BWP without involvement of the NW. Alternatively, the UE may not switch back but stay on the initial active BWP after modification period n+1 ends, waiting for next L1 signaling from the NW (e.g., DCI) for BWP switching.

Figure 2:
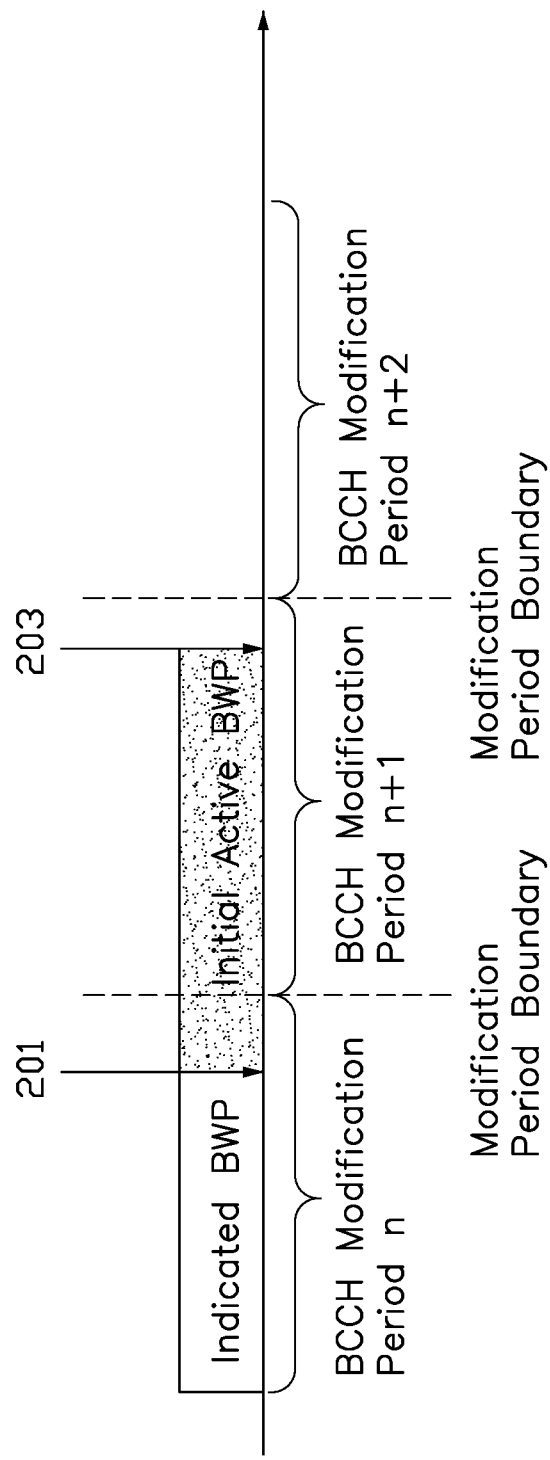
FIG. 2 is a schematic diagram illustrating a BWP switching operation for a Connected_UE due to receiving an SI change indication in accordance with one exemplary embodiment of the present disclosure.

In one embodiment of the present disclosure, the Connected UE may feedback to the NW while the SI update is completed, and the NW may re-take control over the BWP switching immediately upon receiving the feedback. In FIG. 2, a BWP switching operation for an RRC_connected UE due to receiving an SI change indication is illustrated. The UE may operate on an indicated BWP as currently active BWP for data transmission or operate on an initial active BPW able to receive the content of changed SI required for the UE SI update. Within modification period n, the UE may operate on the indicated BWP for data transmission according to L1 signaling.

The SI change indication is sent to the UE by paging (e.g., a Short Message) from the NW while the UE may operate on the indicated BWP. At 201, upon receiving the SI change indication, UE may switch to the initial active BWP immediately from the indicated BWP in BCCH modification period n. The SI change indication is used to inform the UE that there is SI change(s) or update(s), and may be carried as part of Short Message in the paging. Then, RRC sublayer of the NW may inform the PHY sublayer that the paging has been sent to the UE and the switching of the UE to the initial active BWP has been performed. So, the NW may stop sending to the UE any other L1 signaling for BWP switching operations, and wait for the UE feedback indicating the completeness of the SI update.

After switching to the initial active BWP, the UE may continue to stay on the initial active BWP until the update to SI is completed. At 203, the UE completed the SI update if required and feedback to the NW that the system information update is completed by sending an SI update complete indication. Upon receiving the SI update complete indication as the UE feedback, the PHY sublayer of the NW may re-take control over the BWP switching operation immediately. Although the UE has to operate on the initial active BWP for the SI update in DL, the NW may be still able to schedule data transmission on the initial active BWP.

The UE feedback of SI update complete may be sent by L1 signaling (via PUCCH) or by MAC-CE transmission on an uplink (UL) BWP paired with the initial active DL BWP. If using L1 signaling, the upper sublayer (e.g., RRC) of the UE may inform PHY sublayer that the SI update is completed, and the UE PHY sublayer may feedback it to the NW. The NW may re-take control over the BWP switching after receiving the feedback in NW PHY sublayer. Alternatively, if using MAC-CE transmission, the upper sublayer of the UE may inform MAC sublayer that the system information update is completed, and the UE MAC sublayer may feedback it to the NW. The NW may re-take control over the BWP switching once receiving the feedback in NW MAC sublayer.

Figure 3:
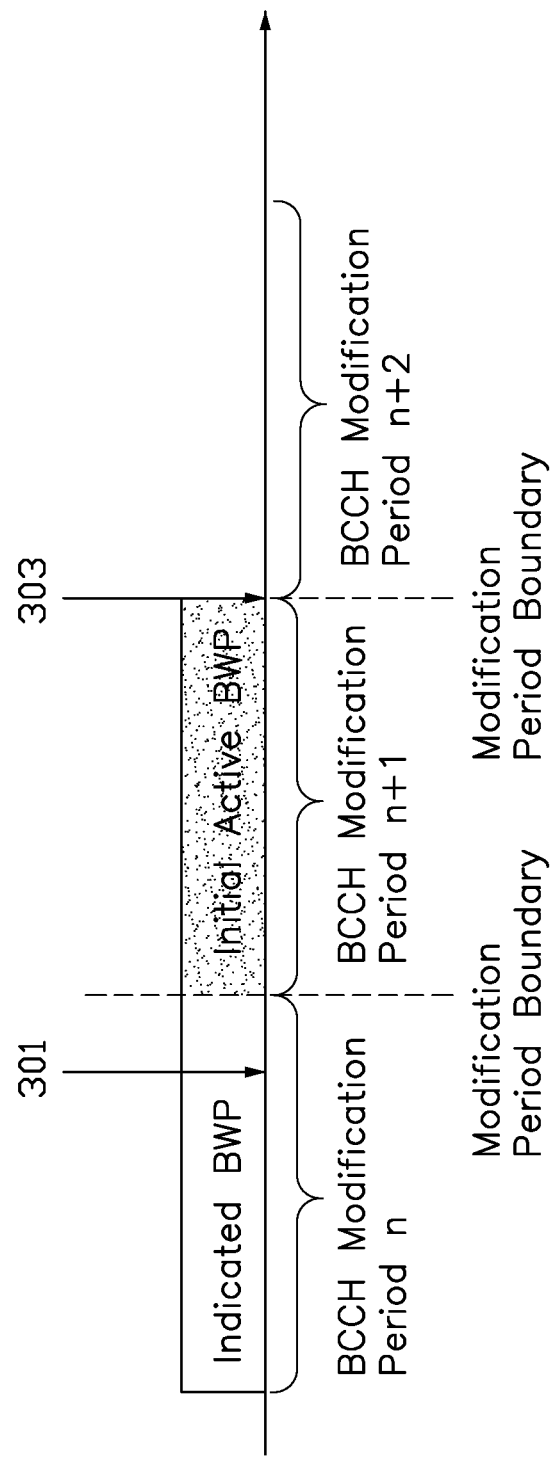
FIG. 3 is a schematic diagram illustrating a BWP switching operation for a Connected_UE due to receiving an SI change indication in accordance with one exemplary embodiment of the present disclosure.

In one embodiment of the present disclosure, upon receiving the SI change indication, the UE may not switch to the initial active BPW until the current BCCH modification period ends. In FIG. 3, a BWP switching operation for an RRC_connected UE due to receiving an SI change indication is illustrated. The UE may operate on an indicated BWP as currently active BWP for data transmission or operate on an initial active BPW able to receive the content of changed SI required for the UE SI update. Within BCCH modification period n, the UE may operate on the indicated BWP for data transmission according to L1 signaling.

The SI change indication is sent to the UE by paging (e.g., a Short Message) from the NW while the UE may operate on the indicated BWP. At 301, upon receiving the SI change indication, UE may continue to stay on the indicated BWP instead of switching immediately to the initial active BWP. Then, the UE switches to the initial active BWP automatically on the ending boundary of BCCH modification period n. The BWP switching operation(s) for the UE could be still performed for certain required services before the automatic switching to the initial active BWP takes place on the end of BCCH modification period n.

In this case, PHY sublayer of the NW may know that the UE switches to the initial active BWP automatically on the end of BCCH modification period n, and may stop sending to the UE any other L1 signaling for BWP switching operations after modification period n ends. The PHY sublayer of the NW may know the UE by default will complete the SI update within the next modification period n+1, the PHY sublayer may re-take control over the BWP switching after BCCH modification period n+1 ends. Therefore, at 303 on the ending boundary of modification period n+1 the NW re-takes the BWP switching operations by sending L1 signaling to switch the initial active BWP to a BWP for data transmission.

After switching to the initial active BWP on the end of modification period n, the UE may wait to receive, via the initial active BWP, broadcast information required for updating to the changed SI in a next BCCH modification period directly following modification period n. Therefore, within BCCH modification period n+1 (the next BCCH modification period as shown in FIG. 3), the UE performs the system information acquisition to update the changed system information if required.

In this case, since the NW may know the UE by default will complete the SI update within the next modification period n+1, the PHY sublayer may re-take control over the BWP switching after BCCH modification period n+1 ends. Therefore, at 303 on the ending boundary of modification period n+1 the NW re-takes the BWP switching operations by sending L1 signaling to switch the initial active BWP to a BWP for data transmission.

Figure 4:
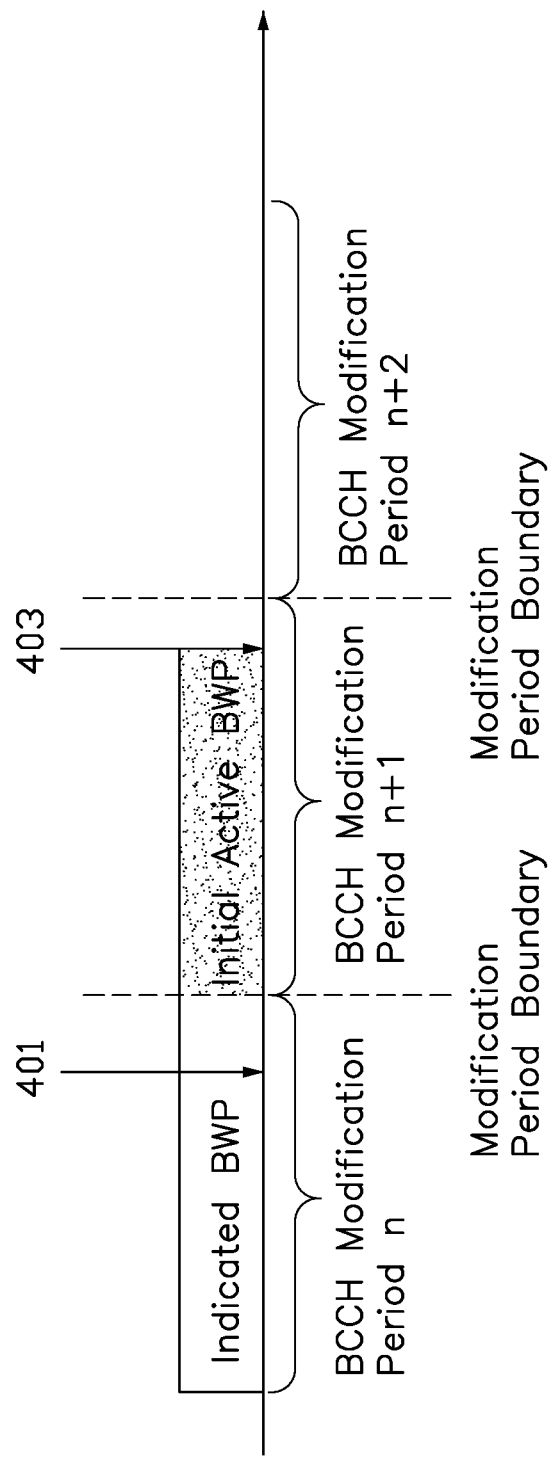
FIG. 4 is a schematic diagram illustrating a BWP switching operation for a Connected_UE due to receiving an SI change indication in accordance with one exemplary embodiment of the present disclosure.

In one embodiment of the present disclosure, the Connected UE may feedback to the NW while the SI update is completed, and the NW may take control over the BWP switching immediately upon receiving the feedback. In FIG. 4, a BWP switching operation for an RRC_connected UE due to receiving an SI change indication is illustrated. The UE may operate on an indicated BWP as currently active BWP for data transmission or operate on an initial active BPW able to receive the content of changed SI required for the UE SI update. Within BCCH modification period n, the UE may operate on the indicated BWP for data transmission according to L1 signaling.

The SI change indication is sent to the UE by paging (e.g., a Short Message) from the NW while the UE may operate on the indicated BWP. At 401, upon receiving the SI change indication, UE may continue to stay on the indicated BWP instead of switching immediately to the initial active BWP. Then, the UE switches to the initial active BWP automatically on the ending boundary of BCCH modification period n. The BWP switching operation(s) for the UE could be still performed for certain required services before the automatic switching to the initial active BWP takes place on the end of modification period n. In this case, PHY sublayer of the NW may know that the UE switches to the initial active BWP automatically on the end of BCCH modification period n, and may stop sending to the UE any other L1 signaling for BWP switching operations after period n ends.

After switching to the initial active BWP on the end of modification period n, the UE may continue to stay on the initial active BWP until the update of the required SI change(s) is completed. At 403, the UE complete the SI update and feedback to the NW that the system information update is completed by sending an SI update complete indication. Upon receiving the SI update complete indication as the UE feedback, the PHY sublayer of the NW may re-take control over the BWP switching operation at 403. Although the UE has to operate on the initial active BWP for the SI update in DL, the NW may be still able to schedule data transmission on the initial active BWP.

The UE feedback of SI update complete may be sent by L1 signaling (via PUCCH) or by MAC-CE transmission on an uplink (UL) BWP paired with the initial active DL BWP. If using L1 signaling, the upper sublayer (e.g., RRC) of the UE may inform PHY sublayer that the SI update is completed, and the UE PHY sublayer may feedback it to the NW. The NW may re-take control over the BWP switching after receiving the feedback in NW PHY sublayer. Alternatively, if using MAC-CE transmission, the upper sublayer of the UE may inform MAC sublayer that the system information update is completed, and the UE MAC sublayer may feedback it to the NW. The NW may re-take control over the BWP switching once receiving the feedback in NW MAC sublayer.

Figure 5:
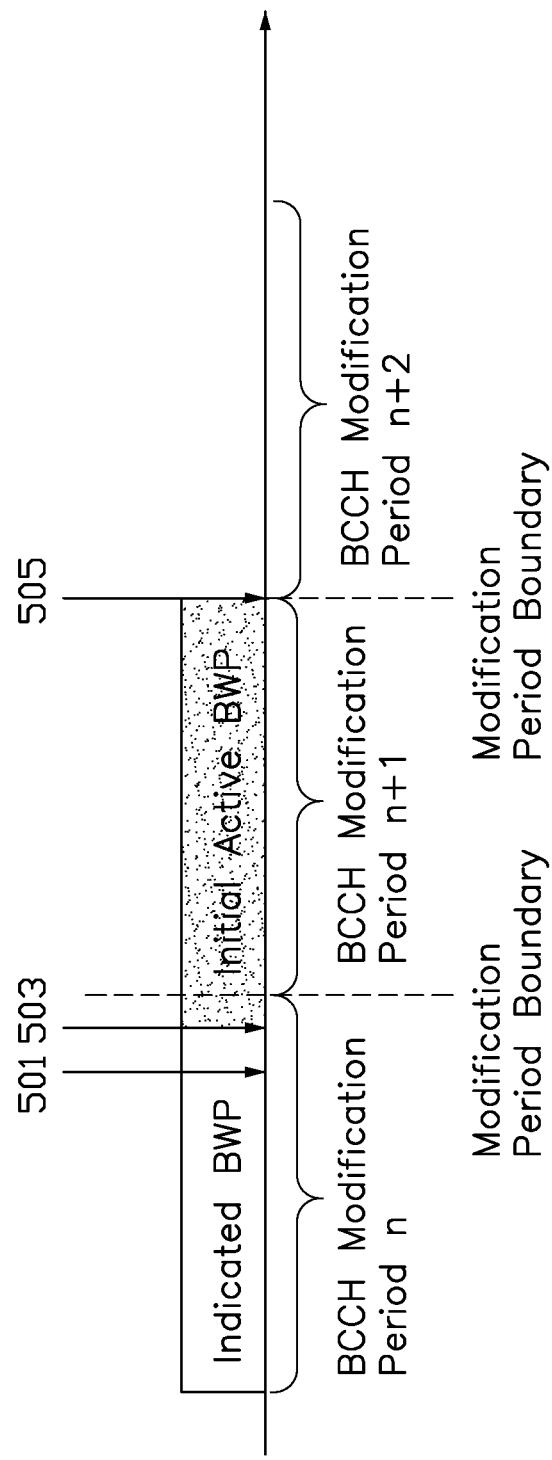
FIG. 5 is a schematic diagram illustrating a BWP switching operation for a Connected_UE due to receiving an SI change indication in accordance with one exemplary embodiment of the present disclosure.

In one embodiment of the present disclosure, after receiving an SI change indication the UE may not switch to an initial active BWP until an L1 signaling is received from the NW. In FIG. 5, a BWP switching operation for an RRC_connected UE due to receiving an SI change indication is illustrated. The UE may operate on an indicated BWP as currently active BWP for data transmission or operate on an initial active BPW able to receive the content of changed SI required for the UE SI update. Within BCCH modification period n, the UE may operate on the indicated BWP for data transmission according to L1 signaling.

The SI change indication is sent to the UE by paging (e.g., a Short Message) from the NW while the UE may operates on the indicated BWP in BCCH modification period n. At 501, upon receiving the SI change indication, the UE may not switch to the initial active BWP but continue to stay on the indicated BWP. On the NW side, the RRC sublayer may inform the PHY sublayer that the SI change indication is sent to the UE. The SI change indication may be carried as part of the Short Message in the paging. In response to the UE reception of the SI change indication, the PHY sublayer of the NW may schedule the L1 signaling and decide when to send the L1 signaling to switch the UE to the initial active BWP. After sending the SI change indication, the NW may perform the L1 signaling before BCCH modification period n ends.

At 503, the UE switches to the initial active BWP in response to receiving the L1 signaling sent from the NW in BCCH modification period n, and the NW may also stop sending to the UE any other L1 signaling for BWP switching operations. In this case, the PHY sublayer of the NW may know the UE by default will complete the SI update within the next modification period (i.e., BCCH modification period n+1 as shown in FIG. 5), and the PHY sublayer may re-take control over the BWP switching after BCCH modification period n+1 ends.

Thus, at 505 the NW re-takes control over the BWP switching operations on the ending boundary of modification period n+1 by sending L1 signaling to switch the initial active BWP to a BWP for data transmission.

Figure 6:
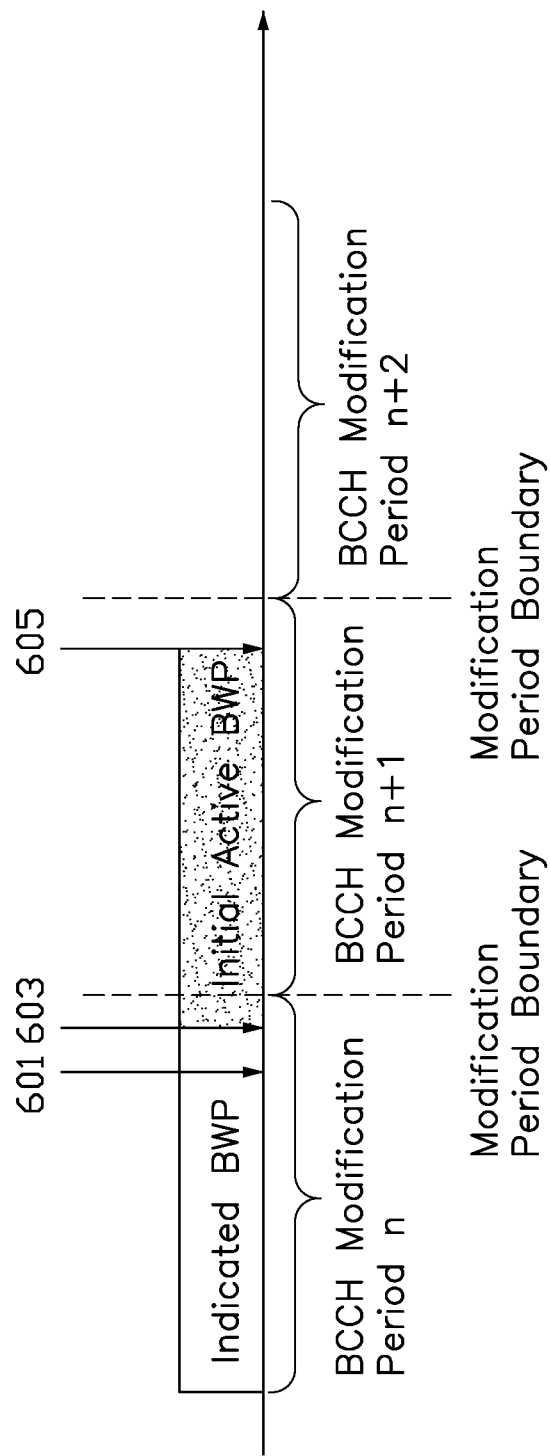
FIG. 6 is a schematic diagram illustrating a BWP switching operation for a Connected_UE due to receiving an SI change indication in accordance with one exemplary embodiment of the present disclosure.

Alternatively, the NW may re-take control over the BWP switching operations upon receiving a feedback from the UE indicating the SI update is complete before BCCH modification period n+1 ends. In FIG. 6, the UE receives a L1 signaling for switching to the initial active BWP at 603 after receiving the SI change indication at 601 in modification period n, followed by the SI update operations in modification period n+1. Once the UE completes the SI update at 605, the UE feedback of SI update complete (e.g., an SI update completeness indication) may be sent by another L1 signaling (via PUCCH) or by MAC-CE transmission on an uplink (UL) BWP paired with the initial active DL BWP. If using L1 signaling, the upper sublayer (e.g., RRC) of the UE may inform PHY sublayer that the SI update is completed, and the UE PHY sublayer may feedback it to the NW. The NW may re-take control over the BWP switching after receiving the feedback in NW PHY sublayer. If using MAC-CE transmission, the upper sublayer of the UE may inform MAC sublayer that the system information update is completed, and the UE MAC sublayer may feedback it to the NW. The NW may re-take control over the BWP switching once receiving the feedback in NW MAC sublayer.

In one embodiment of the present disclosure, the UE may receive a public warning system (PWS) notification indication for ETWS indication or CMAS indication carried in Short Message of a paging. The PWS notification indication notifies the UE of immediate reception of a PWS notification. When a Connected UE receives a PWS notification indication broadcasted by paging of the NW, the RRC sublayer of the UE may inform the PHY sublayer that a PWS notification reception is required immediately.

If the UE receives the PWS notification indication(s) of a paging from the NW, the UE has to immediately start receiving the PWS notification(s) according to the scheduling information in RMSI. The PWS notification indication may trigger the UE to perform re-acquisition of the scheduling information in RMSI for checking scheduling changes for the SIBs associated with the PWS notification(s). Once the SIB(s) associated with the corresponding PWS notification(s) is no longer scheduled, the UE could stop receives the SIB(s).

Figure 7:
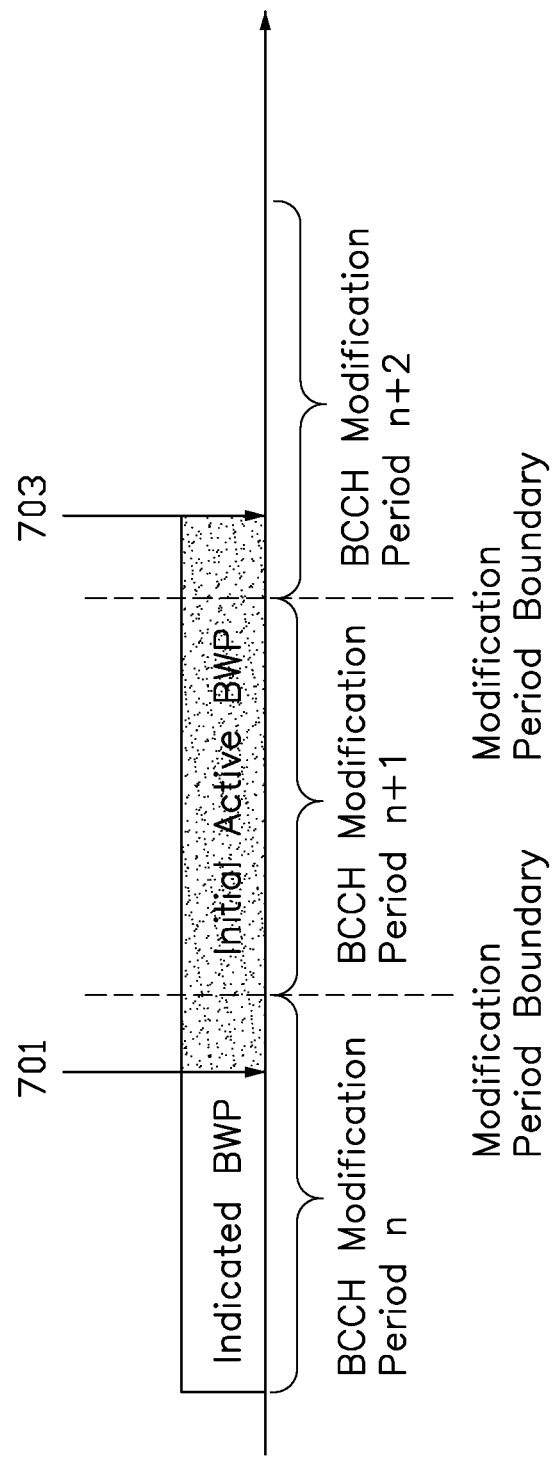
FIG. 7 is a schematic diagram illustrating a BWP switching operation for a Connected_UE due to receiving a public warning system (PWS) notification indication in accordance with one exemplary embodiment of the present disclosure.

In FIG. 7, a BWP switching operation for an RRC_connected UE due to receiving a PWS notification indication is illustrated. The UE may operate on an indicated BWP as currently active BWP for data transmission or operate on an initial active BPW able to receive the content of changed SI required for the UE SI update. Within BCCH modification period n, the UE may operate on the indicated BWP as the current active BWP for data transmission according to L1 signaling.

The PWS notification indication is sent to the UE by paging (e.g., a Short Message) from the NW while the UE operates on the indicated BWP. At 701, upon receiving the PWS notification indication, UE may switch automatically to the initial active BWP from the indicated BWP in BCCH modification period n. The PWS notification indication may be carried as part of Short Message in the paging. Then, RRC sublayer of the NW may inform the PHY sublayer that the paging has been sent to the UE. So, the PHY sublayer of the NW knows successful automatic switching to the initial active BWP and may stop sending to the UE any other L1 signaling for BWP switching operations. The PHY sublayer of the NW would wait for the information from upper layer(s) indicating the stop of broadcasting PWS notification(s) at a certain time point, e.g. at 703 in BBCH modification period n+2. Then, the PHY sublayer in the NW could re-start to take control over BWP switching operation(s).

Figure 8:
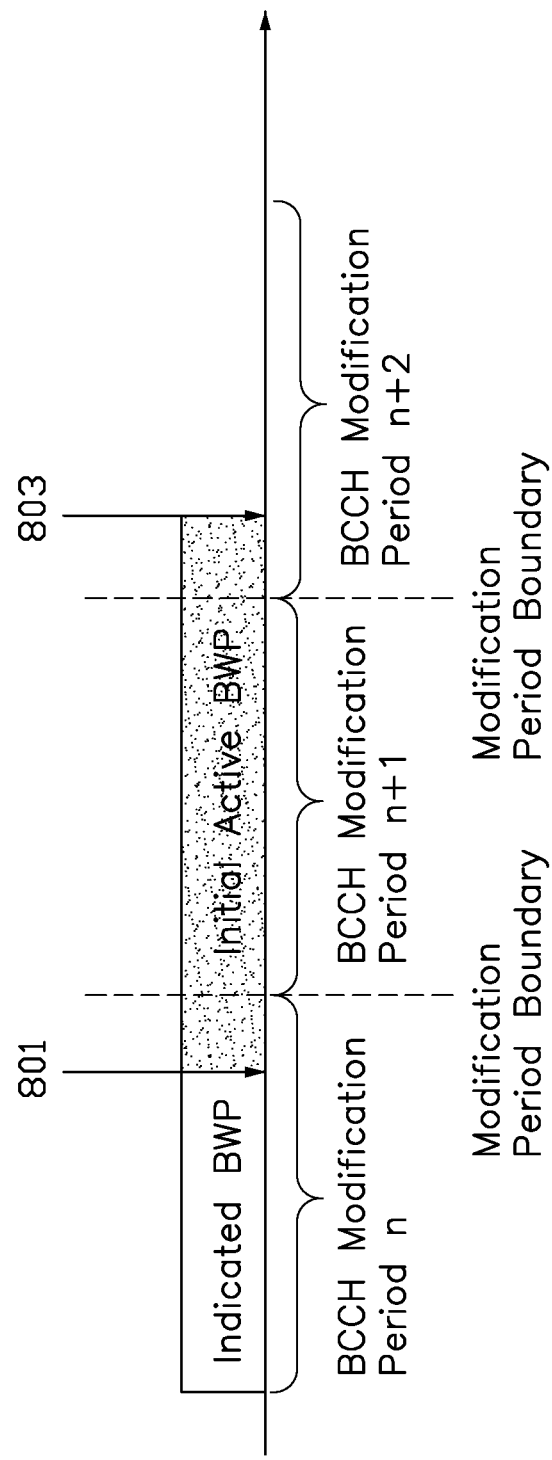
FIG. 8 is a schematic diagram illustrating a BWP switching operation for a Connected_UE due to receiving a public warning system (PWS) notification indication in accordance with one exemplary embodiment of the present disclosure.

In another embodiment of the present disclosure, the Connected UE may feedback to the NW while the PWS notification is no longer scheduled, and the NW may re-take control over the BWP switching immediately upon receiving the feedback. In FIG. 8, a BWP switching operation for an RRC_connected UE due to receiving a PWS notification indication is illustrated. The UE may operate on an indicated BWP as currently active BWP for data transmission or operate on an initial active BPW able to receive the content of changed SI required for the UE SI update. Within BCCH modification period n, the UE may operate on the indicated BWP for data transmission according to L1 signaling.

The PWS notification indication is sent to the UE by paging (e.g., a Short Message) from the NW while the UE may operates on the indicated BWP. At 801, upon receiving the PWS notification indication, UE may switch to the initial active BWP automatically from the indicated BWP in BCCH modification period n. The PWS notification indication may be carried as part of Short Message in the paging. Then, RRC sublayer of the NW may inform the PHY sublayer that the paging has been sent to the UE and the switching of the UE to the initial active BWP has been performed. So, the NW may stop sending to the UE any other L1 signaling for BWP switching operations, and wait for the UE feedback indicating the PWS notification is no longer scheduled.

At 803, the UE may inform the NW of the stopping broadcast of the PWS notification(s) by a feedback that indicates the PWS notification is no longer scheduled.

Figure 9:
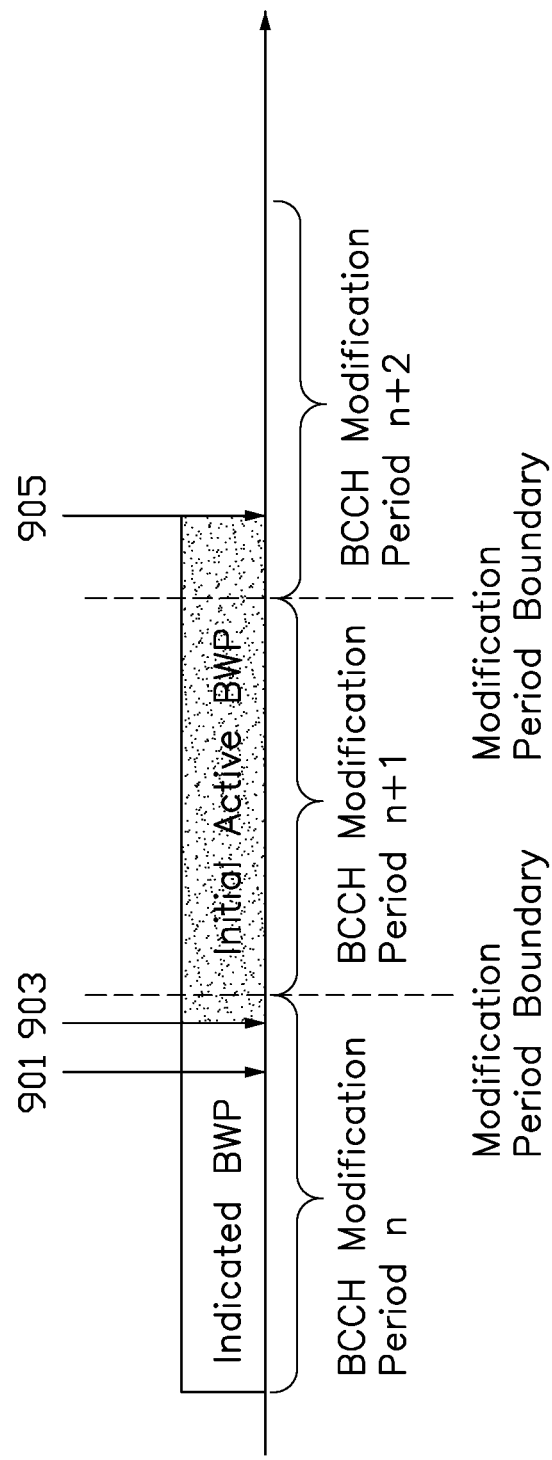
FIG. 9 is a schematic diagram illustrating a BWP switching operation for a Connected_UE due to receiving a public warning system (PWS) notification indication in accordance with one exemplary embodiment of the present disclosure.

In one embodiment of the present disclosure, after receiving a PWS notification indication the UE may not switch to an initial active BWP until an L1 signaling is received from the NW. Since the PWS notification is for emergence, the L1 signalling for switching the UE to the initial active BWP shall be transmitted as fast as possible. In FIG. 9, a BWP switching operation for an RRC_connected UE due to receiving a PWS notification indication is illustrated. The UE may operate on an indicated BWP as currently active BWP for data transmission or operate on an initial active BPW able to receive the content of changed SI required for the UE SI update. Within BCCH modification period n, the UE may operate on the indicated BWP for data transmission according to L1 signaling.

The PWS notification indication is sent to the UE by paging (e.g., a Short Message) from the NW while the UE may operate on the indicated BWP in BCCH modification period n. At 901, upon receiving the PWS notification indication, the UE may not switch to the initial active BWP but continue to stay on the indicated BWP until an L1 signaling from the NW is received. At 903, the UE switches to the initial active BWP in response to receiving the L1 signaling sent from the NW in BCCH modification period n, and the NW may also stop sending to the UE any other L1 signaling for BWP switching operations. At 905, the PHY sublayer of the NW would wait for the information from upper layer(s) indicating the stop of broadcasting PWS notification(s) at a certain time point, e.g. in BCCH modification period n+2. Then, the PHY sublayer in the NW could re-start to take control over BWP switching operation(s).

Alternatively, the UE may inform the NW of the stopping broadcast of the PWS notification(s) by a feedback that indicates the PWS notification is no longer scheduled in this case.

In some embodiments of the present disclosure, a BWP inactivity timer is introduced to switch an ongoing indicated BWP (or the currently active BWP) to a default BWP after a certain inactive time. The BWP inactivity timer may start to run for an inactive time period immediately after the UE switches off the default BWP. In other words, no matter what BWPs the Connected_UE currently operates on, the UE may switch back to the default BWP immediately after the BWP inactivity timer expires.

If the initial active BWP is the default BWP, the currently running BWP inactivity timer would stop after receiving Short Message on the configured active BWP. The UE may switch to another BWP after SI acquisition in response to receiving an L1 signalling, and the BWP inactivity timer would reset with the configured value and start running.

If the initial active BWP is not the default BWP, the currently running BWP inactivity timer may keep running. In some embodiments, the BWP inactivity timer would restart with the configured value and start running. It is noted that the configured value may be different from the normal one (i.e., the normal one is not used for SI acquisition upon switching to the initial active BWP). For example, gNB(s) may configure the BWP inactivity timer with two values, one is 5 ms, the other is 40 ms (e.g., equal to the duration of one BCCH modification period), and UE will automatically apply the second one when the UE needs to perform SI acquisition after receiving the SI change indication carried in the Short Message.

In one embodiment of the present application, if the BWP inactivity timer expires but the SI update is not complete, the UE may keep staying on the initial active BWP until the next L1 signalling (e.g., DCI) controls the UE to perform another BWP switching. The NW may need the timing of the SI update completeness by an NW control mechanism (e.g., waiting for the whole BCCH modification period for SI updated as introduced in the above embodiments) or an UE control mechanism (e.g., by waiting for the UE feedback as introduced in the above embodiments). The BWP inactivity timer would then reset and restart while the UE is switched to another BWP, which is not the default BWP. On the other hand, if the BWP inactivity timer is expired but the PWS notification receiving is not complete, the UE would keep staying on the initial active BWP until the next L1 signalling (e.g., DCI) controls the UE to perform another BWP switch. The NW would need the timing of the SI complete by an NW control mechanism (e.g., waiting for the whole BCCH modification period for SI updated as introduced in the embodiments) or an UE control mechanism (e.g., by waiting for the UE feedback as introduced in the embodiment). The BWP inactivity timer may then reset and restart while the UE switches to another BWP, which is not the default BWP. If there is no system information change indication or Public Warning System (PWS) notification indication indicating that the following SI update or PWS notification receiving procedure is required, once the BWP inactivity timer expires, the UE would automatically switch to the default BWP without L1 signalling.

Figure 10:
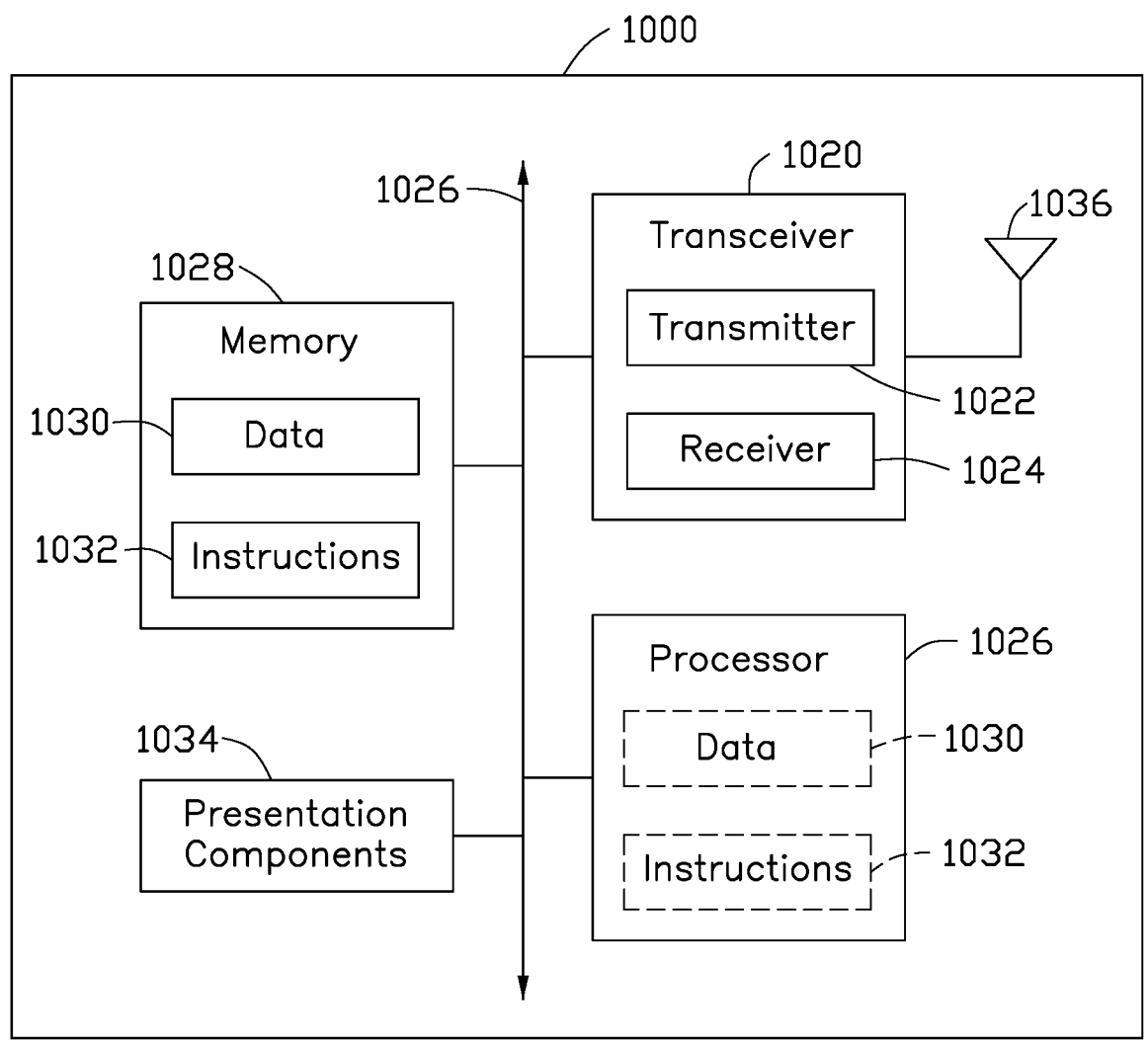
FIG. 10 is a block diagram of a device for wireless communication in accordance with various embodiments of the present disclosure.

FIG. 10 illustrates a block diagram of a device for wireless communication, according to various exemplary implementations of the present disclosure. As shown in FIG. 10, device 1000 may include transceiver 1020, processor 1026, memory 1028, one or more presentation components 1034, and at least one antenna 1036. Device 1000 may also include an RF spectrum band module, a base station communications module, a network communications module, and a system communications management module, input/output (I/O) ports, I/O components, and power supply (not explicitly shown in FIG. 10). Each of these components may be in communication with each other, directly or indirectly, over one or more buses 1026.

Transceiver 1020 having transmitter 1022 and receiver 1024 may be configured to transmit and/or receive time and/or frequency resource partitioning information. In some implementations, transceiver 1020 may be configured to transmit in different types of subframes and slots including, but not limited to, usable, non-usable and flexibly usable subframes and slot formats. Transceiver 1020 may be configured to receive data and control channels.

Device 1000 may include a variety of computer-readable media. Computer-readable media can be any available media that can be accessed by device 1000 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1028 may include computer-storage media in the form of volatile and/or non-volatile memory. Memory 1028 may be removable, non-removable, or a combination thereof. Exemplary memory includes solid-state memory, hard drives, optical-disc drives, and etc. As illustrated in FIG. 10, memory 1028 may store computer-readable, computer-executable instructions 1032 (e.g., software codes) that are configured to, when executed, cause processor 1026 to perform various functions described herein, for example, with reference to FIGS. 1 through 9. Alternatively, instructions 1032 may not be directly executable by processor 1026 but be configured to cause device 1000 (e.g., when compiled and executed) to perform various functions described herein.

Processor 1026 may include an intelligent hardware device, e.g., a central processing unit (CPU), a microcontroller, an ASIC, and etc. Processor 1026 may include memory. Processor 1026 may process data 1030 and instructions 1032 received from memory 1028, and information through transceiver 1020, the base band communications module, and/or the network communications module. Processor 1026 may also process information to be sent to transceiver 1020 for transmission through antenna 1036, to the network communications module for transmission to a core network.

One or more presentation components 1034 presents data indications to a person or other device. Exemplary one or more presentation components 1034 include a display device, speaker, printing component, vibrating component, and etc.

From the above description it is manifest that various techniques can be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method for a user equipment (UE) of a connected state, the method comprising:
   receiving a system information (SI) change indication broadcasted by a paging via a currently active bandwidth part (BWP) during a modification period;
   in response to receiving the SI change indication, switching from the currently active BWP to an initial active BWP for an SI update;
   receiving remaining minimum SI (RMSI) via the initial active BWP during a next modification period that immediately follows the modification period, wherein the RMSI includes information associated with changed system information blocks (SIBs);
   determining which of the changed SIBs is required to be updated for the UE according to the received RMSI; and
   receiving content of the required changed SIBs based on the determination.

2. The method of claim 1, wherein the currently active BWP is switched to the initial active BWP automatically on the end of the modification period.

3. The method of claim 1, wherein the currently active BWP is switched to the initial active BWP immediately upon receiving the SI change indication.

4. The method of claim 1, wherein the currently active BWP is switched to the initial active BWP in response to receiving downlink control information (DCI).

5. The method of claim 1, further comprising:
completing the SI update of the required changed SIBs within the next modification period in response to receiving the content of the required changed SIBs.

6. The method of claim 1, further comprising:
sending an SI update complete indication as a feedback indicating completeness of the SI update via an uplink BWP.

7. The method of claim 1, wherein the UE is pre-configured with a default BWP and a BWP inactivity timer for the connected state, and wherein the UE starts the BWP inactivity timer after switching off the default BWP and switches back to the default BWP after the BWP inactivity timer expires.

8. The method of claim 7, wherein the BWP inactivity timer stops after the currently active BWP for data transmission is switched to an initial active BWP in response to receiving the SI change indication.

9. The method of claim 7, wherein the BWP inactivity timer is further configured to have a short period and a long period, and wherein the UE selects the long period for the BWP inactivity timer upon receiving the SI change indication.

10. The method of claim 7, wherein the UE stays on the initial active BWP in order to complete the SI update after the BWP inactivity timer expires.

11. A user equipment (UE) for wireless communication, comprising:
a non-transitory machine-readable medium storing computer-executable instructions;
a processor coupled to the non-transitory computer-readable medium, and configured to execute the computer-executable instructions to cause the UE of a connected state to perform operations comprising:
receiving a system information (SI) change indication broadcasted by a paging via a currently active bandwidth part (BWP) during a modification period;
in response to receiving the SI change indication, switching from currently active BWP to an initial active BWP for an SI update; and
receiving remaining minimum SI (RMSI) via the initial active BWP during a next modification period that immediately follows the modification period, wherein the RMSI includes information associated with changed system information block (SIB);
determining which of the changed SIBs is required to be updated for the UE according to the received RMSI; and
receiving content of the required changed SIBs based on the determination.

12. The UE of claim 11, wherein the currently active BWP is switched to the initial active BWP automatically on the end of the modification period.

13. The UE of claim 11, wherein the currently active BWP is switched to the initial active BWP immediately upon receiving the SI change indication.

14. The UE of claim 11, wherein the currently active BWP is switched to the initial active BWP in response to receiving downlink control information (DCI).

15. The UE of claim 11, wherein the processor is further configured to execute the computer-executable instructions to cause the UE of a connected state to perform operations comprising:
completing the SI update of the required changed SIBs within the next modification period in response to receiving the content of the required changed SIBs.

16. The UE of claim 15, wherein the processor is further configured to execute the computer-executable instructions to cause the UE of a connected state to perform operations comprising:
sending an SI update complete indication as a feedback indicating completeness of the SI update via an uplink BWP.

17. The UE of claim 11, wherein the UE is pre-configured with a default BWP and a BWP inactivity timer for the connected state, and wherein the UE starts the BWP inactivity timer after switching off the default BWP and switches back to the default after the BWP inactivity timer expires.

18. The UE of claim 17, wherein the BWP inactivity timer stops after the currently active BWP for data transmission is switched to an initial active BWP in response to receiving the SI change indication.

19. The UE of claim 17, wherein the BWP inactivity timer is further configured to have a short period and a long period, and wherein the UE selects the long period for the BWP inactivity timer upon receiving the SI change indication.

20. The UE of claim 17, wherein the UE stays on the initial active BWP in order to complete the SI update after the BWP inactivity timer expires.

* * * * *